US012380168B2

United States Patent
Pasala et al.

(10) Patent No.: US 12,380,168 B2
(45) Date of Patent: Aug. 5, 2025

(54) SYSTEM AND METHOD OF PERFORMING A QUERY PROCESSING IN A DATABASE SYSTEM USING DISTRIBUTED IN-MEMORY TECHNIQUE

(71) Applicant: Infosys Limited, Bangalore (IN)

(72) Inventors: Anjaneyulu Pasala, Bangalore (IN); Sudhakar Vuppalapati, Penumuru (IN)

(73) Assignee: Infosys Limited, Bangalore (IN)

( * ) Notice: Subject to any disclaimer, the term of this patent is extended or adjusted under 35 U.S.C. 154(b) by 952 days.

(21) Appl. No.: 17/513,597

(22) Filed: Oct. 28, 2021

(65) Prior Publication Data
US 2022/0318314 A1    Oct. 6, 2022

(30) Foreign Application Priority Data
Mar. 31, 2021   (IN) .............................. 202141015251

(51) Int. Cl.
*G06F 16/903* (2019.01)

(52) U.S. Cl.
CPC .............................. *G06F 16/90335* (2019.01)

(58) Field of Classification Search
CPC ........................ G06F 16/90335; G06F 16/2471
See application file for complete search history.

(56) References Cited

U.S. PATENT DOCUMENTS

| | | | |
|---|---|---|---|
| 9,489,423 B1 * | 11/2016 | Muthiah | G06F 16/245 |
| 10,262,390 B1 * | 4/2019 | Sun | G06F 9/5077 |
| 10,621,002 B2 * | 4/2020 | Lu | G06F 9/5066 |
| 10,630,559 B2 * | 4/2020 | Moss | G06F 9/45558 |
| 2018/0041600 A1 * | 2/2018 | Aikoh | G06F 11/20 |
| 2019/0258631 A1 * | 8/2019 | Pal | G06F 16/22 |

* cited by examiner

*Primary Examiner* — Huawen A Peng
(74) *Attorney, Agent, or Firm* — Finnegan, Henderson, Farabow, Garrett & Dunner LLP (57) ABSTRACT

A computer aided method of configuring a smart assistant for domain specific self-service; comprising receiving, through a user interface, a predefined domain specific dataset; generating, by a training engine, a set of positive and negative samples in equal ratio; validating the predefined dataset to remove a set of ambiguous data entries; indicating, a numerical representation and a query representation for the predefined dataset; creating a Domain representation using multiple connected layers and use it to process FAQ to understand the best contextual representation; identifying, an accuracy of the configured model by matching with ground truth labels and assigning a confidence score to each entry in the predefined domain specific dataset by creating a Domain representation using multiple connected layers and use it to process FAQ to understand the best contextual representation.

15 Claims, 6 Drawing Sheets

SYSTEM AND METHOD OF PERFORMING A QUERY PROCESSING IN A DATABASE SYSTEM USING DISTRIBUTED IN-MEMORY TECHNIQUE

This application claims the benefit of Indian Patent Application Serial No. 202141015251 filed Mar. 31, 2021, which is hereby incorporated by reference in its entirety.

FIELD

A system and method of performing a query processing in a database system using distributed in-memory technique.

BACKGROUND

Fetching data in real time is a major challenge for organizations, even after implementing Data Warehouses and Business Intelligence solutions. There are cases where the execution of a report takes between a few hours to several days, and the time lost for this execution influences, directly or indirectly, the throughput and efficiency of organizations. Standard databases store the data on disc and the I/O operations are very slow compared to those made in RAM memory.

The need of processing large amounts of data at real time and increase in amount of data was the main reason that led to development of In-Memory RDBMS database. This database revolutionized entire data processing area and shows results where the classical database failed.

There are lots of commercial solution available as In-Memory data base like SAP HANA, Apache Geode etc. However, proposed solution is different from the available solution in multiple aspects. Apache Geode is a distributed, in-memory data management system that provides real-time, consistent access to data-intensive applications. It uses dynamic replication and data partitioning techniques to implement high availability, improved performance, scalability, and fault tolerance.

Altibase is an in-memory database (IMDB) with hybrid architecture. It has Flexible Deployment Mode Combines the benefits of in-memory speed and on-disk storage in a single relational database.

Redis is an open-source, in-memory key-store database system. It can be scaled out as a distributed cluster.

Memcached is free & open source, distributed in-memory key-value object caching system. Memcached is simple yet powerful. It can solve many problems facing large data caches. Its API is available for most popular languages.

Apache Derby, an Apache DB subproject, is an open source relational database implemented entirely in Java. Derby also supports the more familiar client/server mode with the Derby Network Client JDBC driver and Derby Network Server

SUMMARY

A system and method of performing a query processing in a database system using distributed in-memory technique, is provided which constitutes of parsing a user query by a master node to access a metadata related to a table data. The system is configured to generate a physical plan with a set of atomic tasks for a set of worker nodes based on the query and the metadata using a master node. The metadata comprises a schema and a status of the table data and then allocation the set of atomic tasks to the worker nodes is performed by the master node. The atomic tasks for in-memory operation are allocated corresponding to the table data stored on the worker nodes. The worker nodes are tasked with collating a result set based on the in-memory operation and sending the result to the master node. The aggregation of the received results is performed by the master node for display in response to the user query.

The metadata manager comprises table data stores in a set of partitions on worker node based on a set of partition functions. And the physical plan comprises of generating sequence of steps to be executed on table data for the query processing based on the storage information and a set of parameters for query processing.

The table data is stored in a physical memory location or on a cloud based storage service. The master node is comprising of a user interface to receive user query for processing and the worker node operates on at least one atomic task allocated by the master node based on the data stored on it. The worker node is also configured to initialize at least one of a task scheduler, a storage manager and registration of master node.

One of the goals of examples of this technology is to accelerate the SQL query processing in the system by fully utilizing the system resources available in the cluster based systems. Examples of this technology exploit the resources available like main memory and cores in the CPU. In order to further improve the processing, the database schema is built in main memory. Similar to that in the conventional database server executing the query is as though it is being carried on data tables built in in-memory rather than on objects as done in other products. Such a solution provided by examples of this technology resolve problems in the existing systems discussed earlier.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION

Exemplifying embodiments, as described below, may be used to provide a method, an apparatus and/or a system of configuring a smart assistant for domain specific self-service.

Although the present embodiments have been described with reference to specific example embodiments, it will be evident that various modifications and changes may be made to these embodiments without departing from the broader spirit and scope of the various embodiments.

In conventional databases, data is accessed and processed for every transaction or query. This is time consuming, due to heavy load it creates on the server. Hence it takes more time to process huge data sets in tunes of over 50 GB. The instant invention aims to reduce the processing time and hence improve the efficiency of the database system. It can be integrated with most of the artificial intelligence and machine learning platforms for faster processing of transactions for data analytics. Any data analytics applications that need to process large amounts of data can use this utility.

Figure 1:
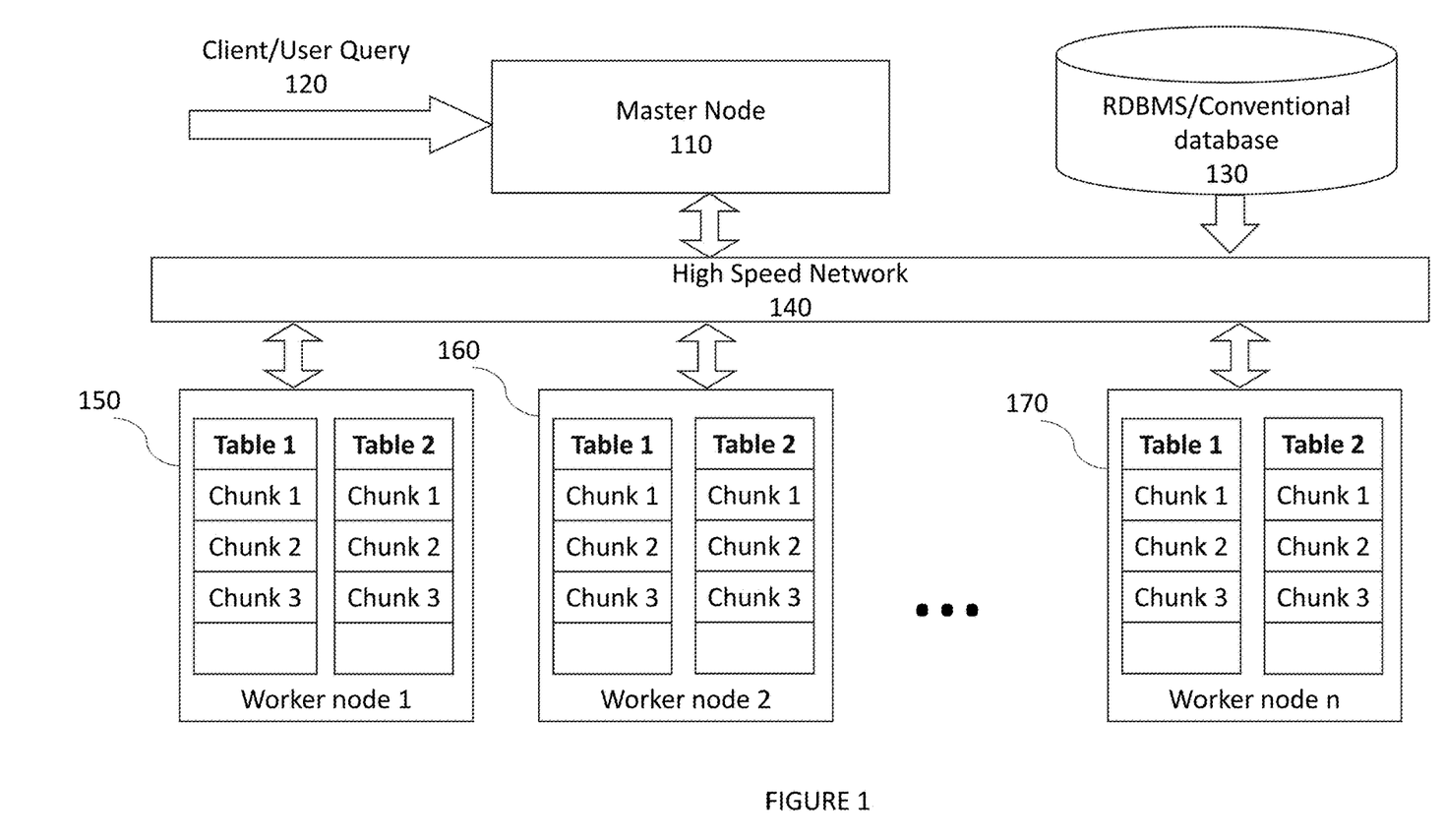
FIG. 1 describes a high-level architecture diagram of In-Memory RDBMS or conventional database engine.

In one embodiment a high-level architecture diagram of In-Memory RDBMS or conventional database engine is described in reference to FIG. 1. It is based on a master-slave architecture of query processing. A Master Node (110) is configured to parse a Client/user query (120). The master node has a database catalog information for the associated RDBMS (130). Based on the query and the catalog information, master node generates a physical plan with small atomic tasks (chunks). These tasks are allocated to worker nodes (150, 160 & 170) based on data available with it. All worker nodes are configured to collect the data as per task allocated and transmit back the result. Thus, the received results are aggregated by the master node and presented to the client.

Figure 2:
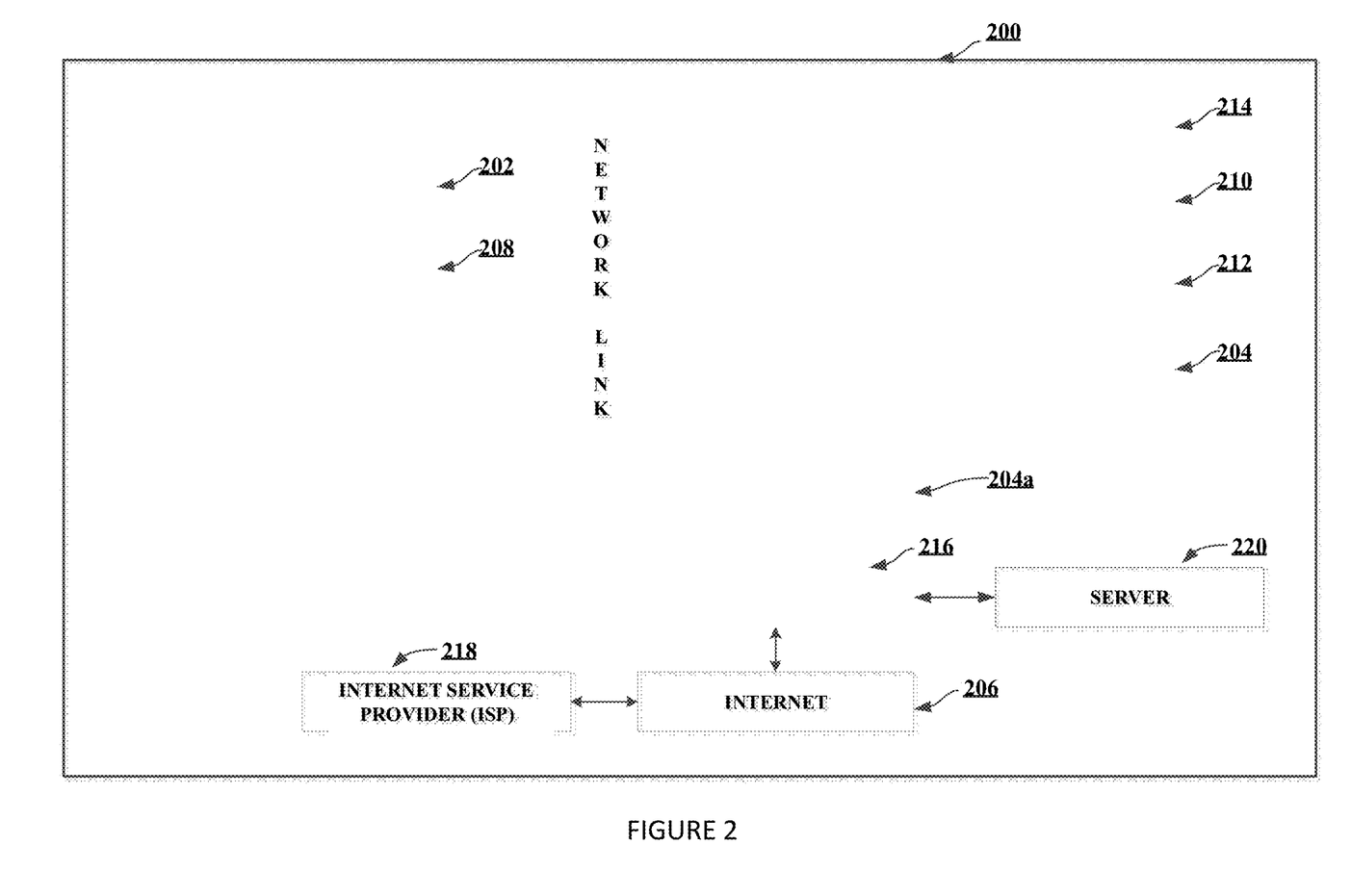
FIG. 2 is a block diagram of a computing device to which the present disclosure may be applied according to an embodiment of the present disclosure.

FIG. 2 is a block diagram of a computing device 200 to which the present disclosure may be applied according to an embodiment of the present disclosure. The system includes at least one processor 202, designed to process instructions, for example computer readable instructions (i.e., code) stored on a storage device 104. By processing instructions, processing device 202 may perform the steps and functions disclosed herein. Storage device 204 may be any type of storage device, for example, but not limited to an optical storage device, a magnetic storage device, a solid state storage device and a non-transitory storage device. The storage device 204 may contain software 204a which is a set of instructions (i.e. code). Alternatively, instructions may be stored in one or more remote storage devices, for example storage devices accessed over a network or the internet 206. The computing device also includes an operating system and microinstruction code. The various processes and functions described herein may either be part of the microinstruction code or part of the program (or combination thereof) which is executed via the operating system. Computing device 200 additionally may have memory 208, an input controller 210, and an output controller 212 and communication controller 214. A bus (not shown) may operatively couple components of computing device 200, including processor 202, memory 208, storage device 204, input controller 210, output controller 212, and any other devices (e.g., network controllers, sound controllers, etc.). Output controller 212 may be operatively coupled (e.g., via a wired or wireless connection) to a display device (e.g., a monitor, television, mobile device screen, touch-display, etc.) in such a fashion that output controller 212 can transform the display on display device (e.g., in response to modules executed). Input controller 210 may be operatively coupled (e.g., via a wired or wireless connection) to input device (e.g., mouse, keyboard, touchpad, scroll-ball, touch-display, etc.) in such a fashion that input can be received from a user. The communication controller 214 is coupled to a bus (not shown) and provides a two-way coupling through a network link to the internet 206 that is connected to a local network 216 and operated by an internet service provider (hereinafter referred to as 'ISP') 218 which provides data communication services to the internet. Network link typically provides data communication through one or more networks to other data devices. For example, network link may provide a connection through local network 216 to a host computer, to data equipment operated by an ISP 118. A server 220 may transmit a requested code for an application through internet 206, ISP 218, local network 216 and communication controller 214. Of course, FIG. 2 illustrates a computing device 200 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 200 may be one or more servers, for example a farm of networked servers, a clustered server environment, or a cloud network of computing devices.

Figure 3:
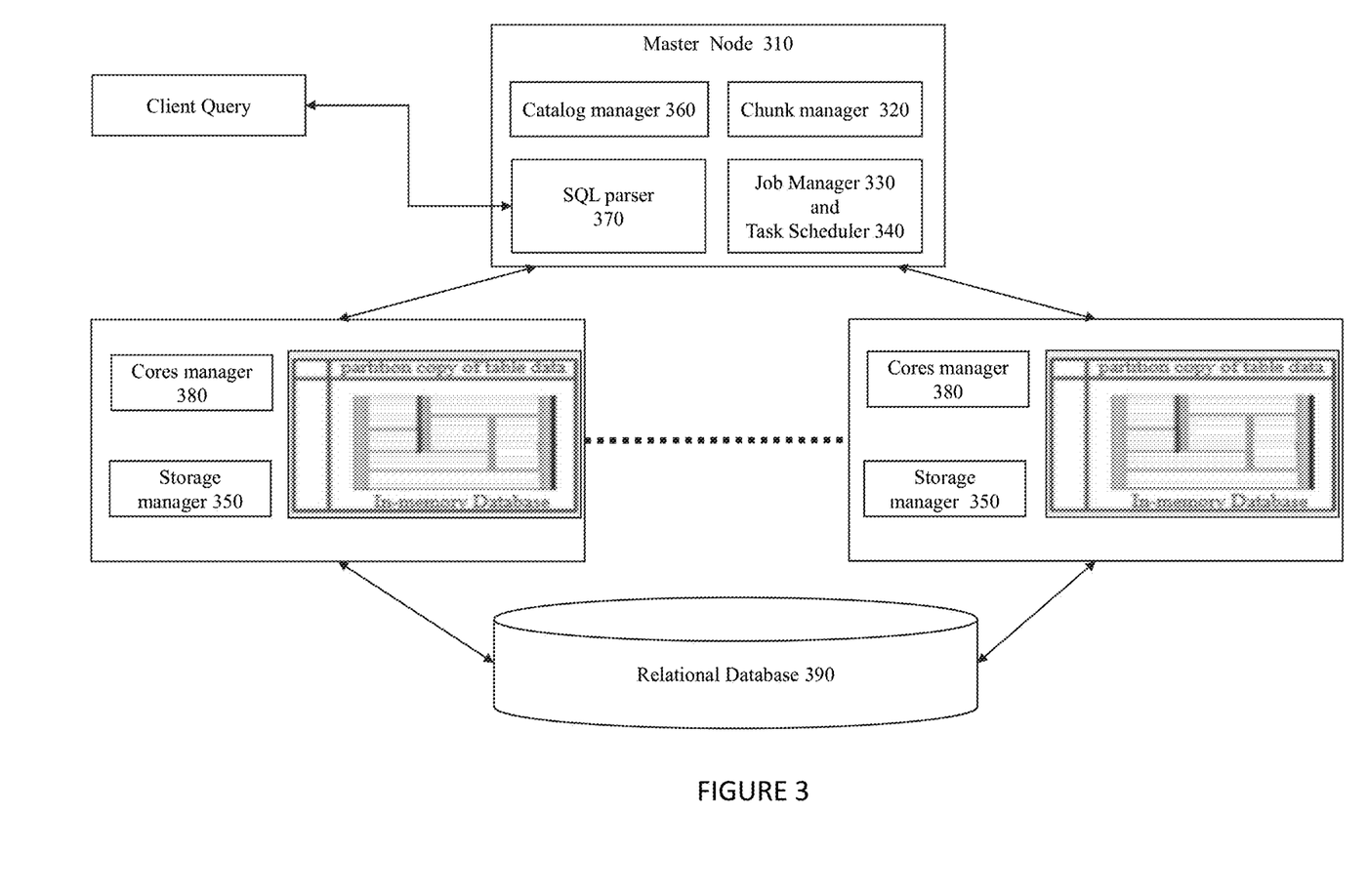
FIG. 3 describes a user/client query in the form of an SQL query being sent to the master node by the client.

In another embodiment, Master Node (Master) is a node/system that interfaces the customer and receives the SQL query for processing the data. The master is configured to perform the set of roles assigned to it, but not limited to manage worker nodes by identifying the no of worker nodes ready to accept jobs etc. to manage jobs, make plans and distribute executable tasks to Worker nodes. It is also configured to Initialize a ChunkManager (320), JobManager (330), TaskScheduler (340) and to start client listener.

In another embodiment, Worker node is responsible for executing tasks distributed by master and manage stored chunks (320). The worker node is configured to perform the set of roles assigned to it, but not limited to Initialize the Task Scheduler, the Storage Manager (350) and to register itself with a Master node.

In one embodiment a worker manager is configured for recording all worker nodes and its necessary information including Node IP address, Port number, Node ID assigned by master, Node status assigned by Akka framework or any other similar framework and Projection details along with Partition information.

In another embodiment, catalog manager is configured to run on the master node and its inbuilt storage stores all the relational schema and status and provides information for generating physical query plan. The In-Memory RDBMS engine is structured in a manner that every table is divided into several partitions according to different partition functions which includes Index of column or Group of columns and details on how each partition happened, and each partition is stored in node. The catalog manager stores the information of all the tables, attributes, primary keys, projection and partition info, and the information of the nodes on which the partitions reside. Catalog Manager also stores catalog information (metadata) of the system. Catalog comprises Tables, which can be partitioned horizontally so that each horizontal piece will be allocated to one worker node.

In one embodiment a chunk is defined as the basic storage unit for task execution, which comprises multiple blocks. A block in a byte array contains consequential rows in bytes. Each Chunk has a unique ChunkId, and a storage level, which can be in-memory, on-disk, on HDFS file system or on any other conventional storage as described in 204. A chunk manager is configured to keep a record of each Chunk and its storage location on a worker node. The worker node is decided based on available memory and Partition method, data is divided. Chuck manager knows how much data can be stored and its details. Each worker Node has unique ID and the Chunk Manager stores the details and mapping of ChunkID and workerID In another embodiment job Manager, records and stores all jobs submitted to the cluster, and schedules each job to execute. SQL text from Client is split by ";" into several SQL query strings. Each SQL query is constructed as a Job, and submitted to Job Manager. SQL parser parses the query and splits the query based the selection of the columns and or/and in the Join Predicate/WHERE Clause Across Multiple Columns, it is configured to create the JOBs and Select the required Projection. It records all necessary information like SQL String, Parsed AST, Logical and Physical plan, General Tasks in a JOB Object. Job Object stores the steps to do to execute the SQL query execution and it is saved in Master node and sub-jobs are sent to worker Node In one more embodiment, a task scheduler present on both Master node and Worker node to create executable tasks on Master node, based on generated physical plan and storage information, and distribute tasks to corresponding Worker nodes.

On Worker Node, Task Scheduler schedules the execution of tasks submitted on this node based on whether the Task is part of the JOB or sub-Job.

In one embodiment a storage manager manifested on the storage 204 manages all of the Chunks which reside on this Worker node. When it gets initialized by Worker node, it loads all existing data from disk to memory as Chunks, and register the Chunk Ids to Chunk Manager.

In another embodiment, FIG. 3 describes a user/client query in the form of an SQL query being sent to the master node by the client, which is then parsed by SQL Parser (370) at the master node. Parsed SQL statement is then converted into Logical plan of query. Logical plan is then converted into Physical plan with the help of Catalog Manager (360) based on the selection columns. Lexical analyzer generates the Logical plan, and the storage manager is used to find the where the data is stored and generate the physical plan. Based on the selection columns, lexical analyzer is used to generate the Logical plan, storage manager to find the where the data is stored and generate the physical plan Once physical plan is ready then it will be sent to corresponding worker node based on the data the particular worker node is having. Worker node retrieves the result based on the task received and then sends back the result to the Master node.

In one embodiment, upon receiving query from client, Master node redirects the client query string to an SQL Parser. The parser may be, but not limited to an ANTLR4 for parser generation from grammar. ANTLR (ANother Tool for Language Recognition) is a powerful parser generator for reading, processing, executing, or translating structured text or binary files. From a grammar, ANTLR generates a parser that can build parse trees and also generates a listener interface (or visitor interface) that makes it easy to respond to the recognition of phrases of interest. The SQL Parser is responsible for generation of AST tree and responsible for generation of execution plan for a given query. Identify the tables, and generate the execution plan or operation type. Sql parser does the semantic analysis and query syntax checking.

Figure 4:
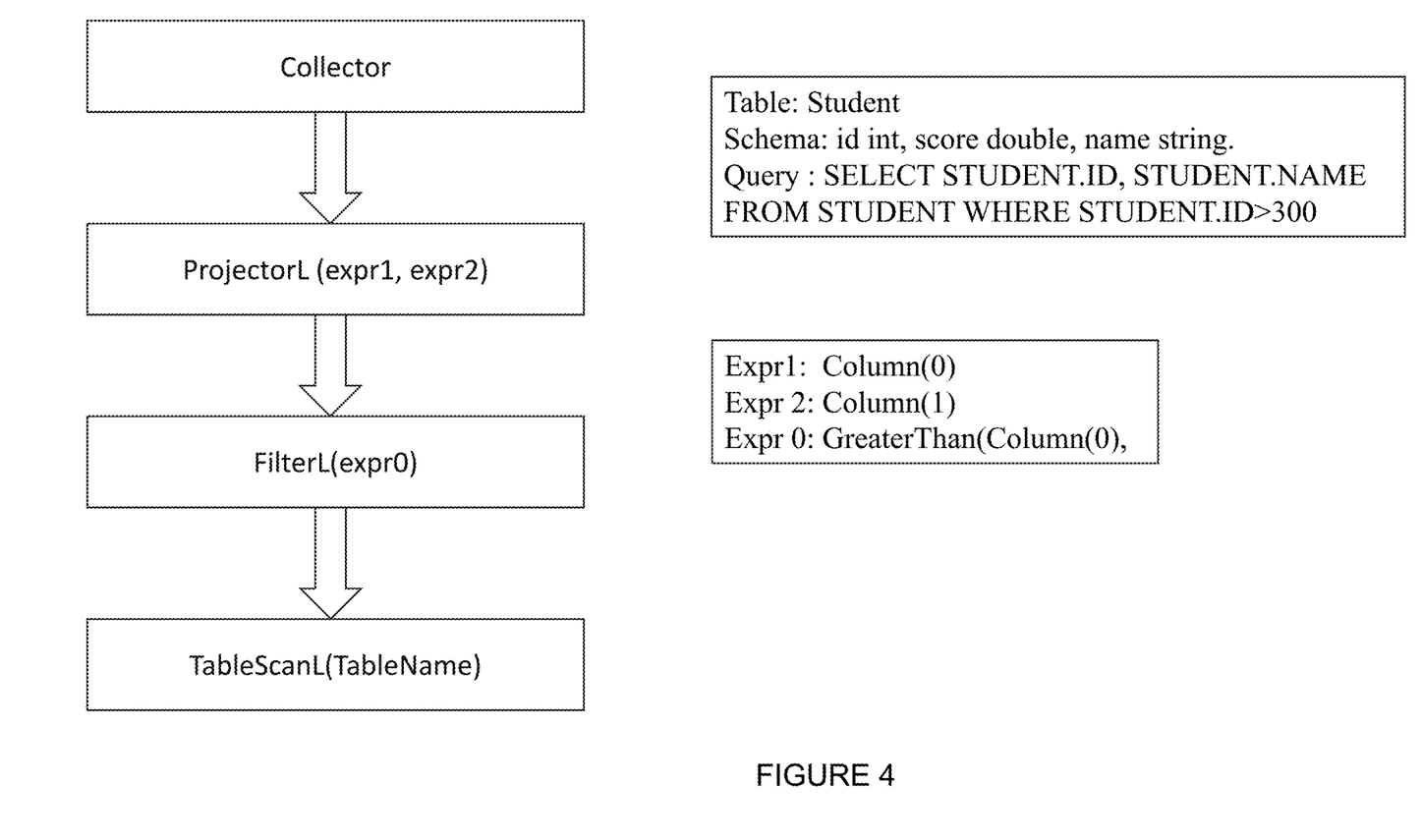
FIG. 4 describes the generation of a logical plan.

In one embodiment generation of a logical plan is described in reference to FIG. 4. Once query statement is parsed by the SQL parser, it is configured to generate logical statement from the query. Logical statement is further converted into logical sequence of steps and may be called logical plan. A logical operator is (fully) resolved to a specific schema when all expressions are resolved. A logical plan contains the size of objects that are results of query operators, like join, through Statistics object. Once ANTLR4 checks the grammar and Syntax, ANTLR4 will logical operators, and logical query. Based on the logical query, the storage manager provides information using which a physical plan is generated. In the Physical plan generation, statistics objects are used which are created based on data available at worker nodes. These details will are stored in the Storage manager which contains partition info, partitioninfo chuck manager. The chuck manager stores the mappings of chuckID and workerID. A logical plan also contains the maximum number of records it can compute. However during this phase, plan generator will not take care about storage information of specific data unit.

Figure 5:
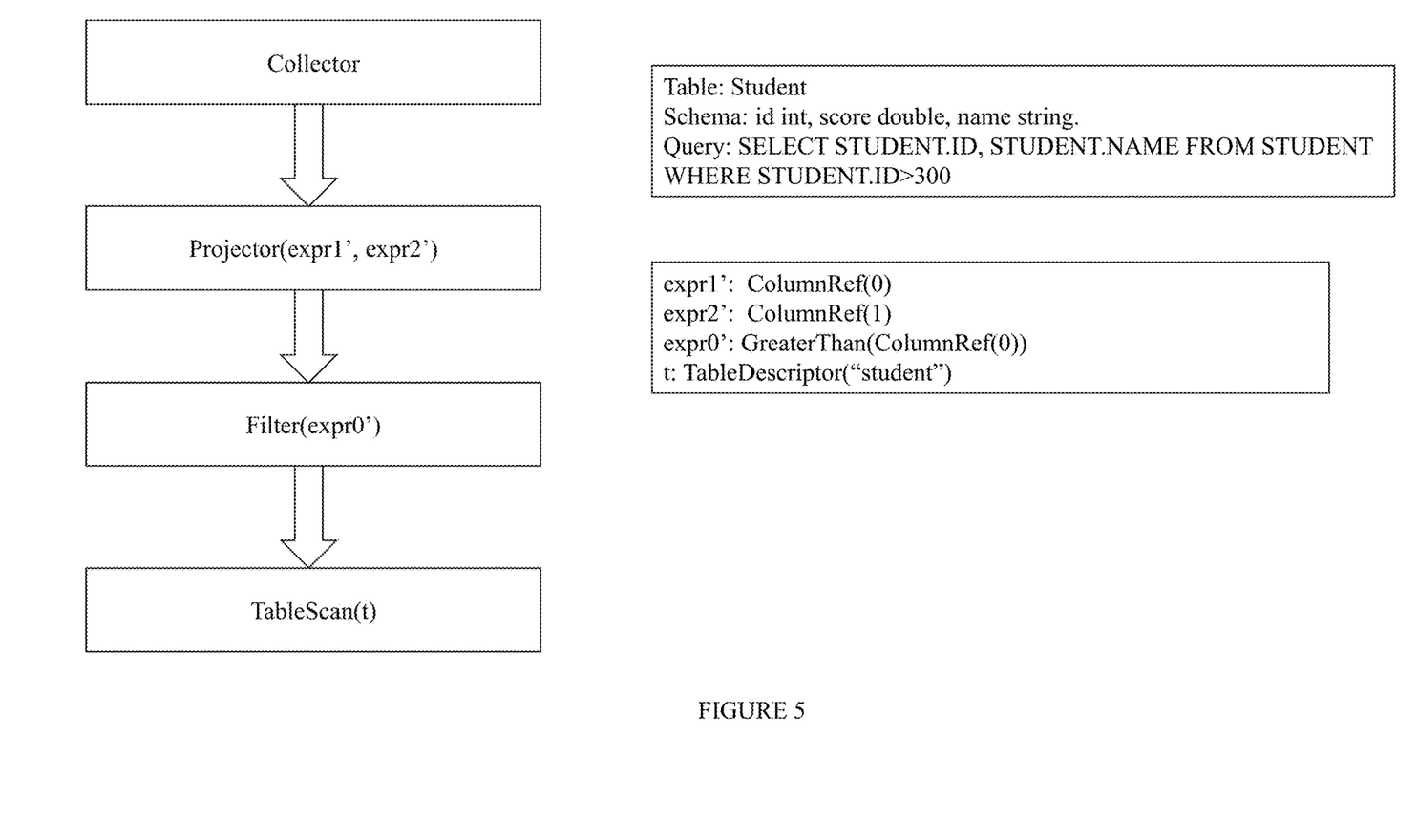
FIG. 5 describes the physical plan generation.

In another embodiment, the physical plan generation is explained in reference to FIG. 5. The logical plan generated is passed to physical plan generator which can generate exact sequence of steps which needs to be executed on data based on the logical plan. The physical plan generator analyses and allocates the storage information for the data. For Ex. Which chunk of data is to be stored on which node. Physical plan generator also generates an order and grouping for sets of joins, unions, and intersections algorithm for each operator (e.g., nest-loop join vs. hash join) additional operators (scanning, sorting, etc.) that are needed for execution of physical plan but not explicitly defined in the logical plan. It also provides the sequence of passing the arguments (e.g. store intermediate result on disk vs. pipeline one tuple or buffer at time).

Figure 6:
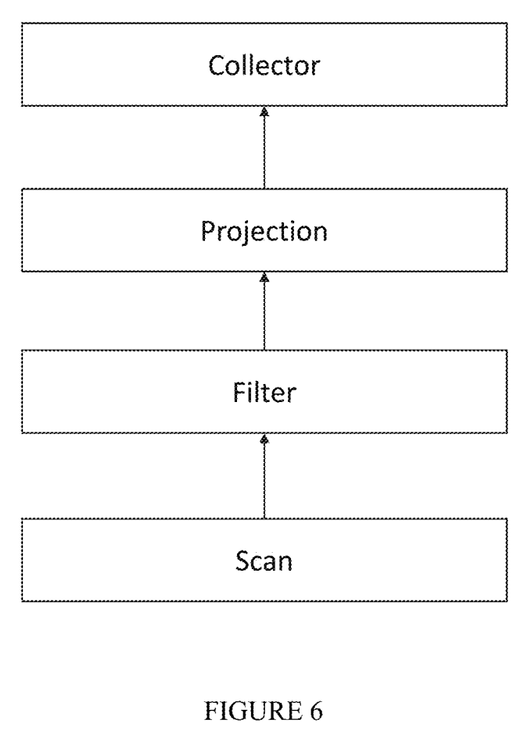
FIG. 6 describes the task operator hierarchy.

In one embodiment execution and result collection for the client query is described. Each Task is a callable object and run as a thread from a thread pool. Each worker has its thread pool with number of threads being equal to the number of cores available. The cores manager (380) stores the information about the number of cores available. Each query task operator follows the task operator hierarchy as described in FIG. 6. Each parent operator Uses All Child operator. For Ex. Filter uses the results of scan. Collected results are constructed as a Result Set object, which contains job execution status (indicating ok or some errors), and execution result. The object is sent back to Client through socket. Each task having been divided into sub-Atomic jobs, will distributed to each actor. The main task is allocated to actor object and this actor will spam child actors for each sub-Atomic job. The main actor will monitor the child actors, if any child actor does not finish the job in specific time period, it will kill the child actor. Actor will either send the results or error based on other sub-task results.

In an exemplifying embodiment, the table may contain fields like employee number, department, primary phone number, address, secondary phone number, dependent list etc (may contain 30 columns but we may require 5 columns very frequently for the same we create projection with required columns). It may be required to access the employee number and associated primary phone number on a frequent basis. In this scenario, a sub table (projection is equivalent to view) is created and the frequently used data is pushed to nodes for storage so that load is distributed for quicker access. These nodes represent the in-memory storage of the data related to the primary phone number of the corresponding employees. Employee dependent details are stored in multiple nodes. This allows to save the compute cost or reuse the resources saved for other purpose. This helps to recreate the projection and distribute to across the node based on requirements.

A system and method of performing a query processing in a database system using distributed in-memory technique, is provided which constitutes of parsing a user query by a master node to access a metadata related to a table data. The system is configured to generate a physical plan with a set of atomic tasks for a set of worker nodes based on the query and the metadata using a master node. The metadata comprises a schema and a status of the table data and then allocation of the set of atomic tasks to the worker nodes is performed by the master node. The atomic tasks for in-memory operation are allocated corresponding to the table data stored on the worker nodes. The worker nodes are tasked with collating a result set based on the in-memory operation and sending the result to the master node. The aggregation of the received results is performed by the master node for display in response to the user query.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, or a portable memory device. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing a query processing in a database system using distributed in-memory technique, the method comprising:
    parsing a user query by a master node to access a metadata related to a table data;
    generating, by the master node, a physical plan with a set of atomic tasks for a set of worker nodes based on the user query and the metadata, wherein the metadata comprises a schema and a status of the table data;
    allocating, by the master node, the set of atomic tasks to the set of worker nodes, wherein the set of atomic tasks for in-memory operation are allocated corresponding to the table data stored on the set of worker nodes;
    receiving, by the master node, a result set collected by the set of worker nodes based on the in-memory operation; and
    aggregating, by the master node, the received result set for display in response to the user query.

2. The method of claim 1, wherein generating the physical plan comprises generating a sequence of steps to be executed on the table data for the query processing based on storage information and a set of parameters for the query processing.

3. The method of claim 1, wherein the table data is stored in a physical memory location or a cloud-based storage service.

4. The method of claim 1, wherein the master node comprises a user interface to receive the user query for processing.

5. The method of claim 1, wherein each worker node of the set of worker nodes operates on at least one atomic task allocated by the master node based on the table data stored on it.

6. The method of claim 5, wherein the worker node initializes at least one of a task scheduler, a storage manager, and registration of the master node.

7. A system of performing a query processing in a database system using distributed in-memory technique, the system comprising:
a processor; and
a memory coupled to the processor configured to be capable of executing programmed instructions comprising and stored in the memory to:
parse a user query by a master node to access a metadata related to a table data;
generate, by the master node, a physical plan with a set of atomic tasks for a set of worker nodes based on the user query and the metadata, wherein the metadata comprises a schema and a status of the table data;
allocate, by the master node, the set of atomic tasks to the set of worker nodes, wherein the set of atomic tasks for in-memory operation are allocated corresponding to the table data stored on the set of worker nodes;
receive, by the master node, a result set collected by the set of worker nodes based on the in-memory operation; and
aggregate, by the master node, the received result set for display in response to the user query.

8. The system of claim 7, further comprising a metadata manager that comprises table data stores in a set of partitions on a worker node of the set of worker nodes, based on a set of partition functions.

9. The system of claim 7, wherein to generate the physical plan, the processor is configured to generate a sequence of steps to be executed on the table data for the query processing based on storage information and a set of parameters for the query processing.

10. The system of claim 7, wherein the table data is stored in a physical memory location or a cloud based storage service.

11. The system of claim 7, further comprising a user interface to receive the user query for processing.

12. The system of claim 7, wherein each worker node of the set of worker nodes operates on at least one atomic task allocated by the master node based on the table data stored on it.

13. The system of claim 12, wherein the worker node initializes at least one of a task scheduler, a storage manager, and registration of the master node.

14. A non-transitory computer readable medium having stored thereon instructions for performing a query processing in a database system using distributed in-memory technique, the non-transitory computer readable medium comprising machine executable code which when executed by at least one processor, causes the at least one processor to perform steps comprising:
parsing a user query to access a metadata related to a table data;
generating a physical plan with a set of atomic tasks for a set of worker nodes based on the user query and the metadata, wherein the metadata comprises a schema and a status of the table data;
allocating the set of atomic tasks to the set of worker nodes, wherein the set of atomic tasks for in-memory operation are allocated corresponding to the table data stored on the set of worker nodes;
receiving a result set collected by the set of worker nodes based on the in-memory operation; and
aggregating the received result set for display in response to the user query.

15. The method of claim 1, wherein generating the physical plan comprises generating an order and grouping for sets of joins, unions, and intersection algorithms for each operator required for executing the physical plan.

* * * * *

UNITED STATES PATENT AND TRADEMARK OFFICE
CERTIFICATE OF CORRECTION

| | | |
|---|---|---|
| PATENT NO. | : 12,380,168 B2 | Page 1 of 1 |
| APPLICATION NO. | : 17/513597 | |
| DATED | : August 5, 2025 | |
| INVENTOR(S) | : Pasala et al. | |

It is certified that error appears in the above-identified patent and that said Letters Patent is hereby corrected as shown below:

On the Title Page

Item (57) Abstract, Line 1: "A computer aided method of" should read as --A method of--.

Item (57) Abstract, Lines 1-16: "configuring a smart assistant for domain specific self-service; comprising receiving, through a user interface, a predefined domain specific dataset; generating, by a training engine, a set of positive and negative samples in equal ratio; validating the predefined dataset to remove a set of ambiguous data entries; indicating, a numerical representation and a query representation for the predefined dataset; creating a Domain representation using multiple connected layers and use it to process FAQ to understand the best contextual representation; identifying, an accuracy of the configured model by matching with ground truth labels contextual representation; identifying, an accuracy of the configured model by matching with ground truth labels and assigning a confidence score to each entry in the predefined domain specific dataset by creating a Domain representation using multiple connected layers and use it to process FAQ to understand the best contextual representation." should read as --performing a query processing in a database system using distributed in-memory technique, comprising parsing a user query by a master node to access a metadata related to a table data; generating, by the master node, a physical plan with a set of atomic tasks for a set of worker nodes based on the user query and the metadata, the metadata comprising a schema and a status of the table data; allocating, by the master node, the set of atomic tasks to the set of worker nodes, the set of atomic tasks for in-memory operation being allocated corresponding to the table data stored on the set of worker nodes; receiving, by the master node, a result set collected by the set of worker nodes based on the in-memory operation; and aggregating, by the master node, the received results result set for display in response to the user query.--.

Signed and Sealed this
Third Day of February, 2026

John A. Squires
*Director of the United States Patent and Trademark Office*